United States Patent
Akemakou

(10) Patent No.: US 6,784,586 B2
(45) Date of Patent: Aug. 31, 2004

(54) HYBRID ALTERNATOR WITH AN AXIAL END RETAINER FOR PERMANENT MAGNETS

(75) Inventor: Antoine Dokou Akemakou, Vitry sur Seine (FR)

(73) Assignee: Valeo Equipments Electriques Moteur, Creteil (FR)

( * ) Notice: Subject to any disclaimer, the term of this patent is extended or adjusted under 35 U.S.C. 154(b) by 80 days.

(21) Appl. No.: 10/204,542

(22) PCT Filed: Jan. 7, 2002

(86) PCT No.: PCT/FR02/00037
§ 371 (c)(1),
(2), (4) Date: Aug. 22, 2002

(87) PCT Pub. No.: WO02/054566
PCT Pub. Date: Jul. 11, 2002

(65) Prior Publication Data
US 2003/0011257 A1 Jan. 16, 2003

(30) Foreign Application Priority Data
Jan. 5, 2001 (FR) ............................................ 01 00122

(51) Int. Cl.[7] .............................................. H02K 21/04
(52) U.S. Cl. ........................ 310/194; 310/181; 310/195; 310/71; 310/91; 310/62; 310/63
(58) Field of Search ................................ 310/181, 194, 310/195, 91, 71, 62, 63

(56) References Cited

U.S. PATENT DOCUMENTS

| 5,177,390 A | * | 1/1993 | Van Maaren | ................ 310/183 |
| 5,663,605 A | * | 9/1997 | Evans et al. | ................ 310/181 |
| 5,693,995 A | * | 12/1997 | Syverson | .................... 310/181 |
| 6,054,792 A |   | 4/2000 | Rowe et al. | ................ 310/260 |
| 6,509,664 B2 | * | 1/2003 | Shah et al. | .................. 310/181 |

FOREIGN PATENT DOCUMENTS

| DE | 41 39 843 C1 | 6/1993 | .......... H02K/21/14 |
| EP | 0 741 444 A1 | 6/1996 | .......... H02K/21/04 |
| WO | WO 96/30992 | 10/1996 | .......... H02K/21/12 |

* cited by examiner

Primary Examiner—Karl Tamai
Assistant Examiner—Yahveh Comas
(74) Attorney, Agent, or Firm—Liniak, Berenato & White

(57) ABSTRACT

The invention relates to a rotating electric machine, especially an alternator or alternator/starter for motor vehicles, including a stator surrounding a rotor (10) equipped with a pack of metal plates, a gap between the stator and the rotor, permanent magnets integrated into the rotor and excitation coils (14) integrated into the rotor, in which the excitation coils are wound around salient poles (1310) cut out in the pack of metal plates of the rotor, and the permanent magnets are accommodated in housings (13110) formed in the pack of plates of the rotor and open towards the periphery of the rotor, characterized in that the housings (13110) are closed axially at each of their ends by a non-magnetic retaining piece (13) equipped with a part intended to come into abutment with the magnets, and in that the retaining piece features recesses for accommodations [sic] of the buns of the excitation coils (14).

10 Claims, 8 Drawing Sheets

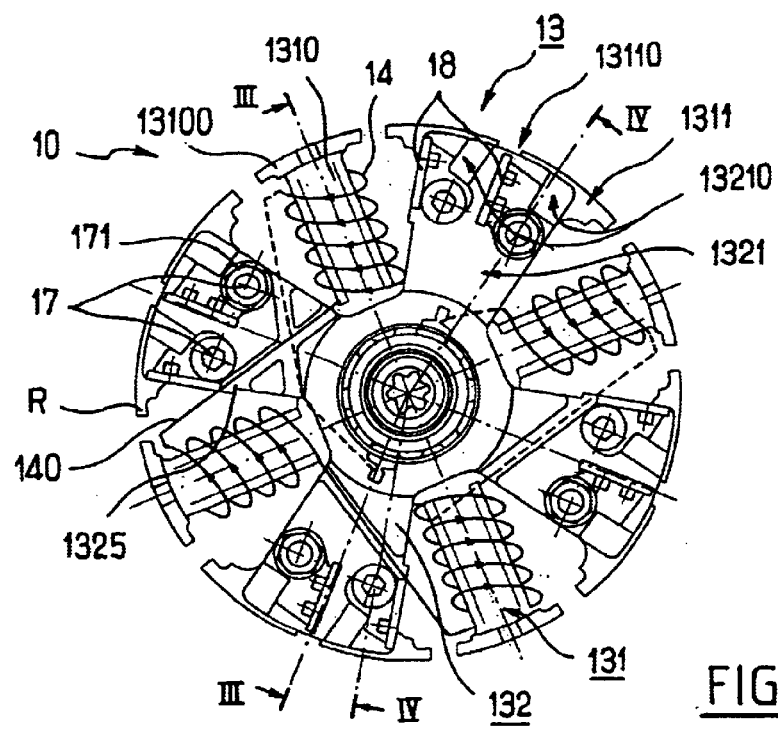
FIG_1
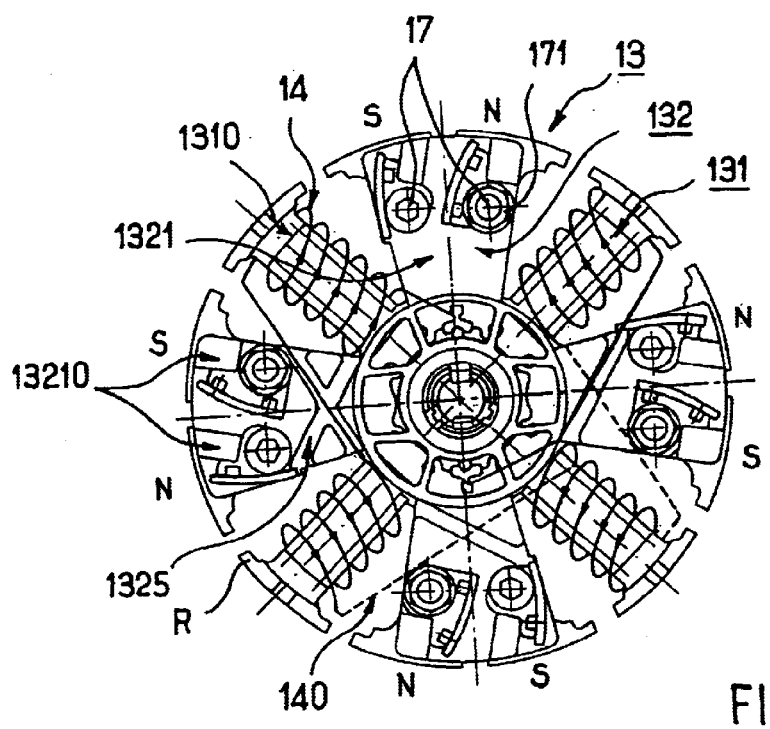
FIG_2

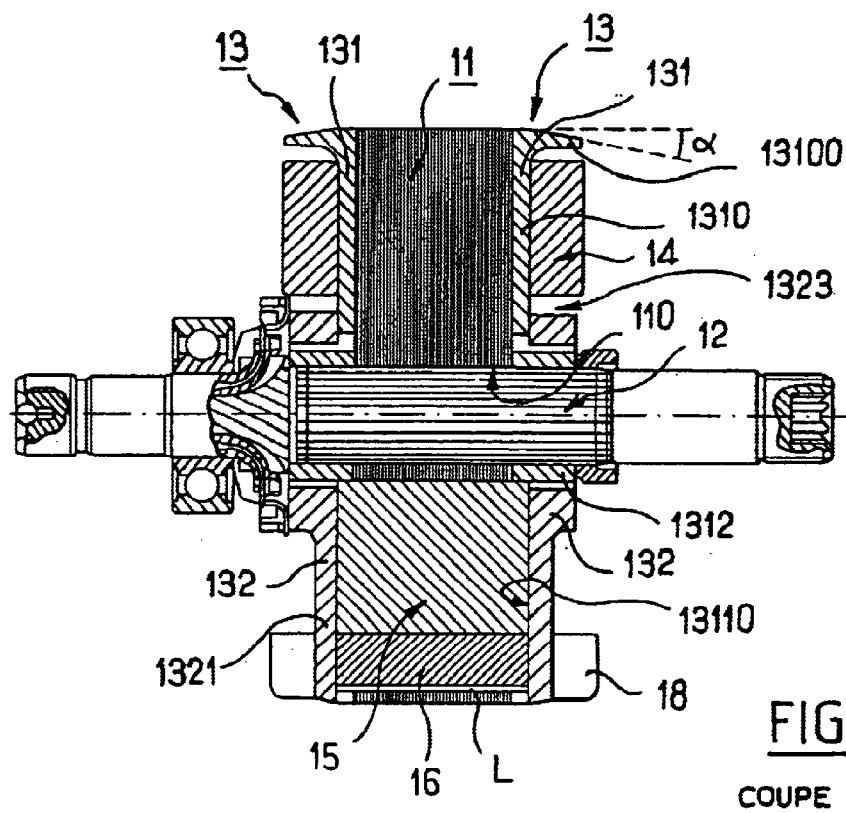
FIG_3
COUPE III-III
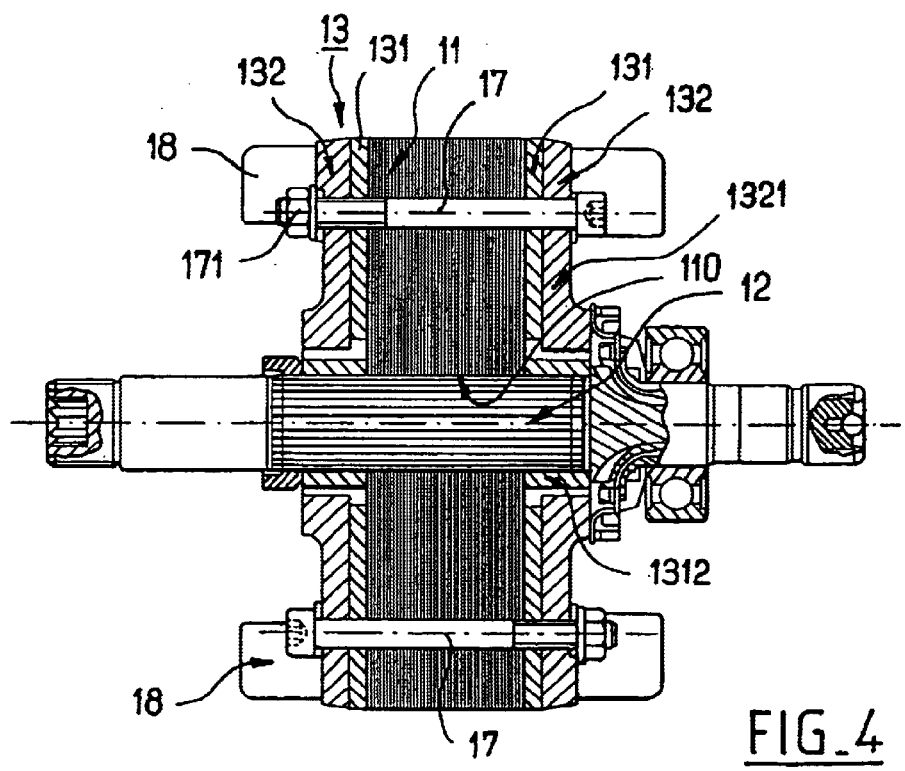
FIG_4
COUPE IV-IV

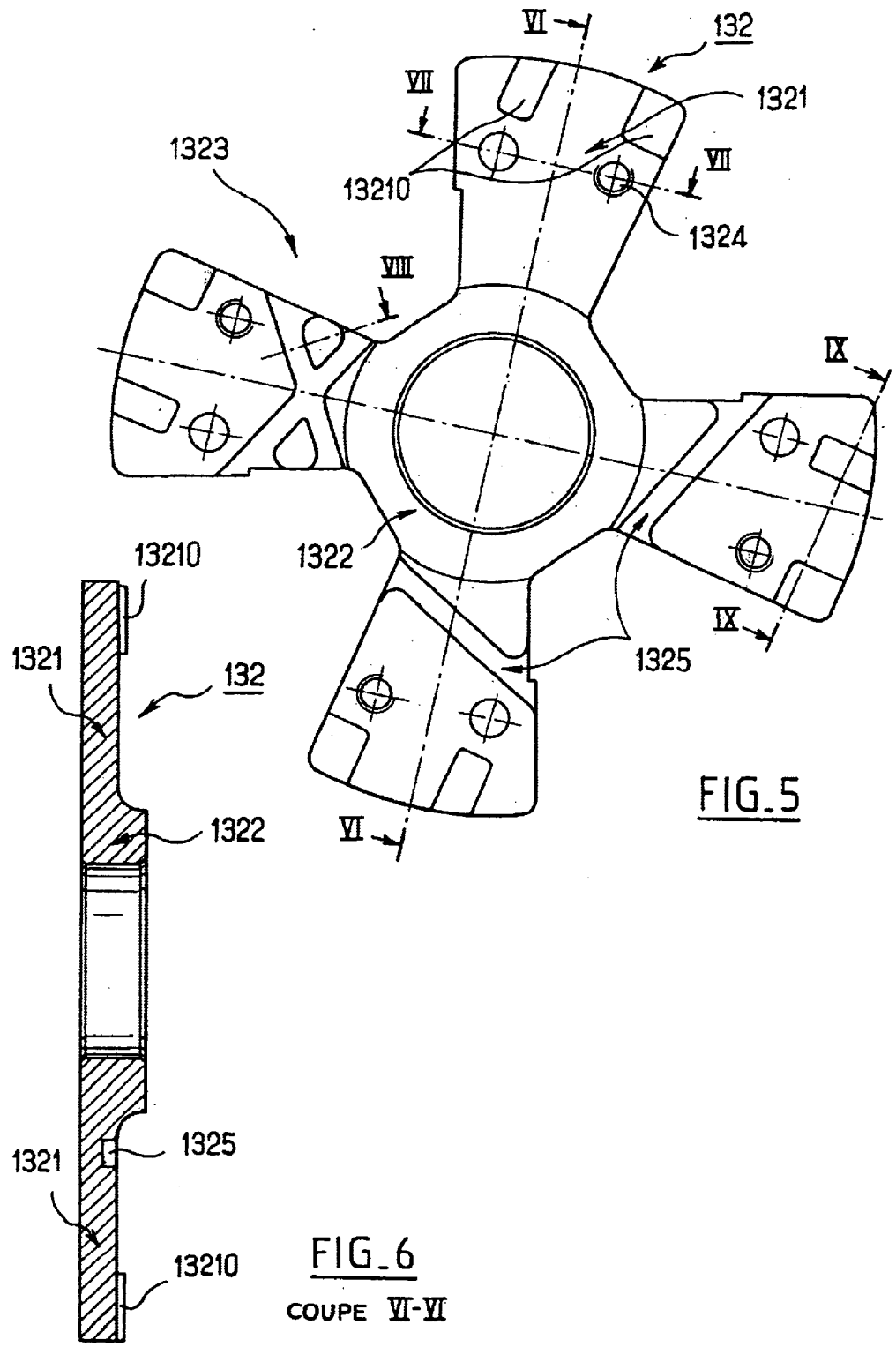
FIG_5
FIG_6
COUPE VI-VI

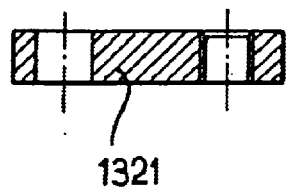
FIG_7
COUPE VII-VII
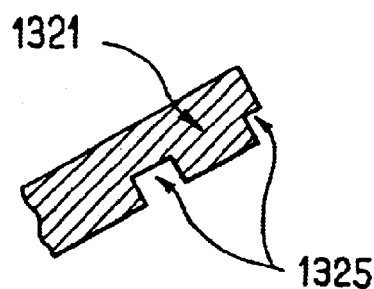
FIG_8
SECTION VIII
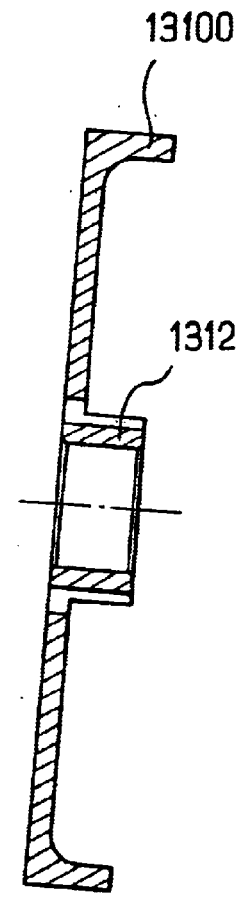
FIG_11
COUPE XI-XI
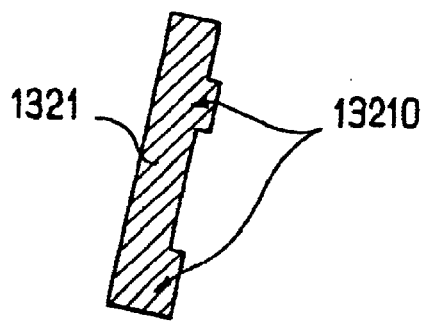
FIG_9
SECTION IX-IX

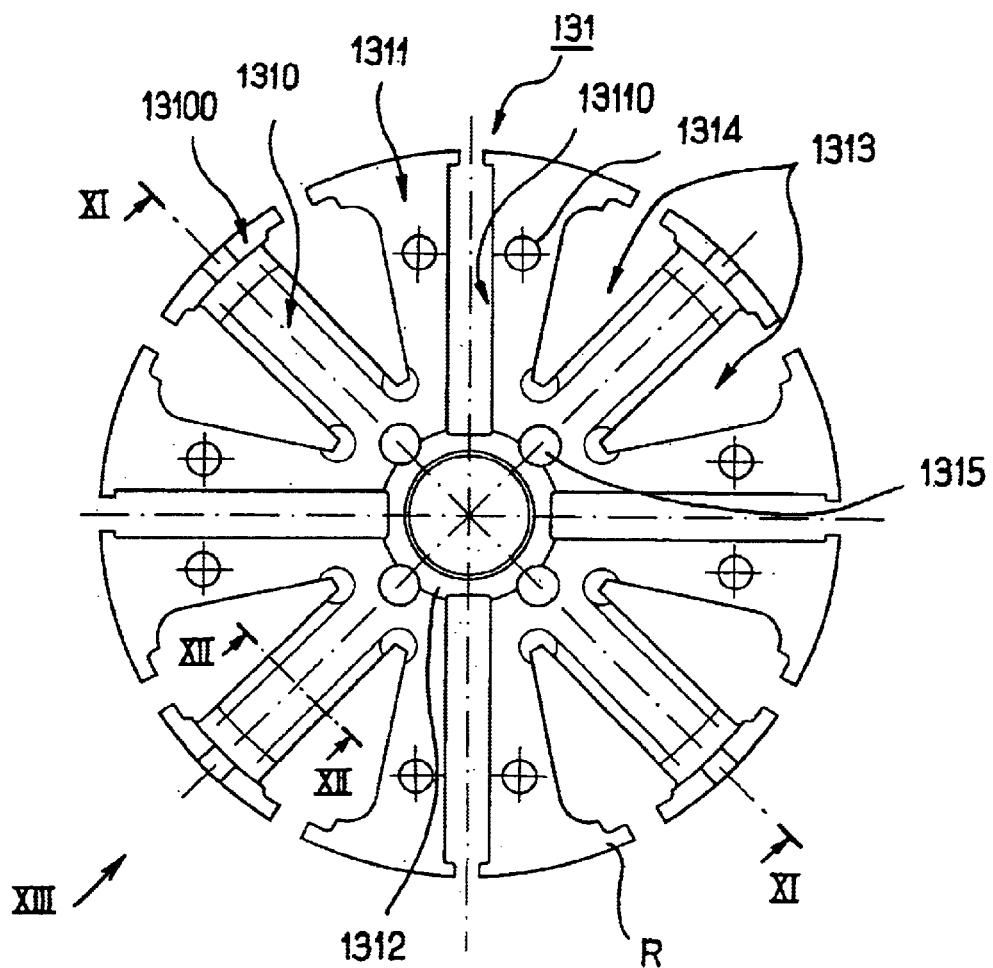
FIG_10
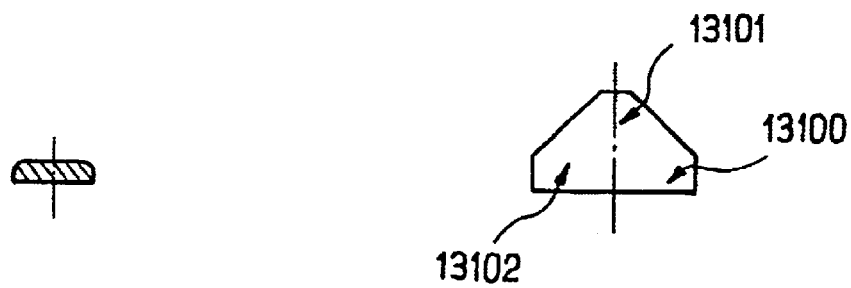
FIG_12  FIG_13

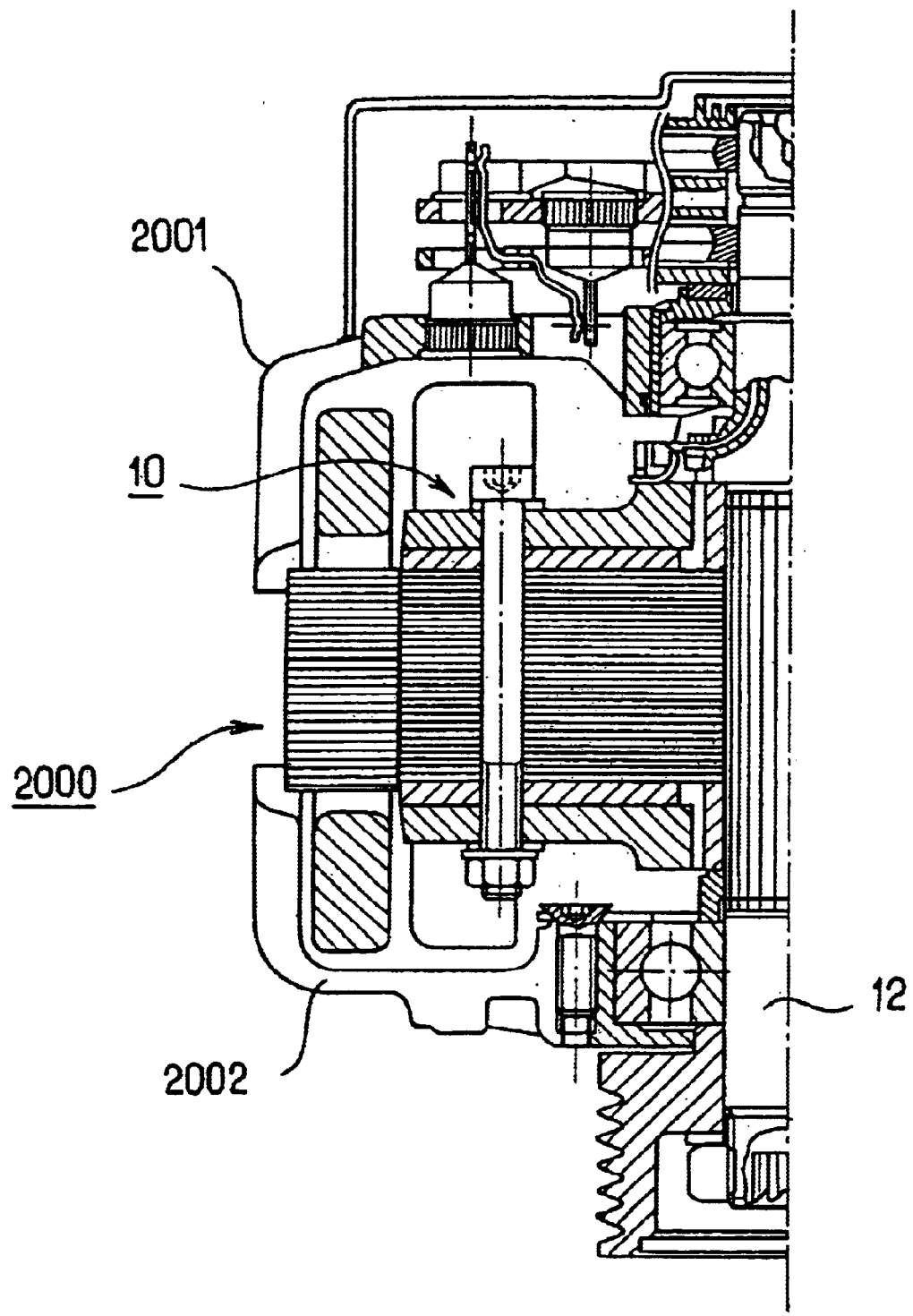
FIG_14

HYBRID ALTERNATOR WITH AN AXIAL END RETAINER FOR PERMANENT MAGNETS

FIELD OF THE INVENTION

The present invention relates in a general way to rotating electric machines.

More precisely, the invention relates to rotating machines of the alternator or alternator/starter type, which are employed in motor vehicles.

And yet more precisely, the invention relates to the rotating machines the rotor of which comprises permanent magnets as well as one or more excitation coils.

Such rotating machines are said to have compound excitation; the excitation of the coil or coils placed in the rotor, driven by a suitable electrical power supply, makes it possible to strengthen or reduce the power delivered by the machine (the sign of the electrical power supply delivered to the excitation coils possibly being reversed).

These compound-excitation machines thus make it possible to enhance the effectiveness of the machine and its flexibility of use.

STATE OF THE ART

An example of such a machine is disclosed by the document EP 741 444. The rotor more particularly set out in FIG. 5 of this document has a claw-type structure comprising magnetised parts, and an annular excitation coil placed around the rotational shaft of the machine.

It is also known to make up the rotor of a rotating machine not by imbricating claws some of which would be magnetised, but by the stacking, parallel to the rotational axis of the machine, of sheet-metal plates cut out beforehand according to the same contour, the said common contour of the metal plates defining housings intended to receive permanent magnets. EP 803 962 discloses an example of such a rotor.

This latter configuration, by comparison with the claw-type configuration, offers the advantage of producing uniform lines of magnetic field along the axial direction of the machine, which is not really the case with a claw-type rotor. And this arrangement enhances the efficiency of the machine.

However the rotor of EP 803 962 does not have compound excitation, which limits the flexibility of this machine in use.

SUBJECT OF THE INVENTION

A first aim of the invention is to make it possible to produce a rotating machine combining the advantages of the two types of machine set out above.

Furthermore, in the case of the machines in which the rotor comprises one or more excitation coils, the application of voltage to the said coils may cause them to heat up, which would impair safety and the efficiency of the machine.

A second aim of the invention is furthermore to ensure safe and efficient operation of the rotating machine, avoiding any excessive heating of elements such as excitation coils.

In order to achieve these aims, the invention proposes a rotating electric machine, especially an alternator or alternator/starter for motor vehicles, including a stator surrounding a rotor equipped with a pack of metal plates, a gap between the stator and the rotor, permanent magnets integrated into the rotor and excitation coils integrated into the rotor, in which the excitation coils are wound around salient poles cut out in the pack of metal plates of the rotor, and the permanent magnets are accommodated in housings formed in the pack of plates of the rotor, characterised in that the housings are closed axially at each of their ends by a retaining piece equipped with a non-magnetic part intended to come into abutment with the magnets, and in that the retaining piece features recesses for accommodating buns of the excitation coils.

Preferred, but non-limiting, aspects of the machine according to the invention are as follows:

the retaining piece, at its outer periphery, features axial extensions directed in the reverse direction with respect to the pack of plates of the rotor and shaped to retain the excitation coils counter to the action of centrifugal force, the end part of the said extensions is inclined towards the rotational axis of the machine, the said extensions have a pointed shape, such as trapezoidal, the said extensions are carried by a ferromagnetic cap which has the same shape as the plates, the said cap being interposed between the pack of plates and a non-magnetic flange, the cap and the flange constituting the retaining piece (13), means for cooling the coils are provided, the said cooling means comprise fan blades, the blades are shaped to create a radial airflow and an axial airflow, the blades are of different sizes, the retaining piece carries fan blades between the excitation coils, and the blades extend in projection from the retaining piece, the blades are of a single piece with the retaining piece, the blades are attached to the retaining piece, the surface of the retaining piece features bosses for holding the blades, the flange features holes for fixing the blades, grooves are provided on the surface of the flange for accommodating a wire of the excitation coils when the said wire passes from one coil to the other, and at least one groove is intersecting, the housings of the permanent magnets are open towards the outer periphery of the rotor, the housings of the permanent magnets are closed at the outer periphery of the rotor as described, for example, in the document U.S. Pat. No. 6,147,429.

BRIEF DESCRIPTION OF THE DRAWINGS

Other aspects, aims and advantages of the invention will become more apparent on reading the following description of an embodiment of the invention, given by reference to the attached drawings, in which:

FIGS. 1 to 4 are views of the same rotor of a machine according to the invention, FIGS. 1 and 2 being two views in elevation corresponding to the two sides of the rotor, the sectional planes III—III and IV—IV being defined in FIG. 1, FIGS. 3 and 4 being sectional views along the respective planes III—III and IV—IV, FIGS. 5 to 9 are views of a flange element of this same rotor, FIG. 5 being a view in elevation of the said element, in which the sectional planes VI—VI and VII—VII, as well as the sectional planes VIII and IX—IX are defined, FIGS. 6 and 7 being views in section of the said element, along the respective planes VI—VI and VII—VII, FIGS. 8 and 9 being views of the said element in section along the respective planes VIII and IX—IX, FIGS. 10 to 13 are views of a second flange element of this same rotor, FIG. 10 being a view in elevation of the said second, rotor-flange element in which the sectional planes XI—XI and XII—XII, as well as the direction XIII and the detail XIV, are defined, FIGS. 11 and 12 are two views of the same second, rotor-flange element, along the respective planes XI—XI and XII—XII, FIG. 13 is a view of a part of the same second element along the direction XIII, FIG. 14 is a partial sectional view of a machine according to the invention.

DESCRIPTION OF PREFERRED EMBODIMENTS OF THE INVENTION

Figure 15:
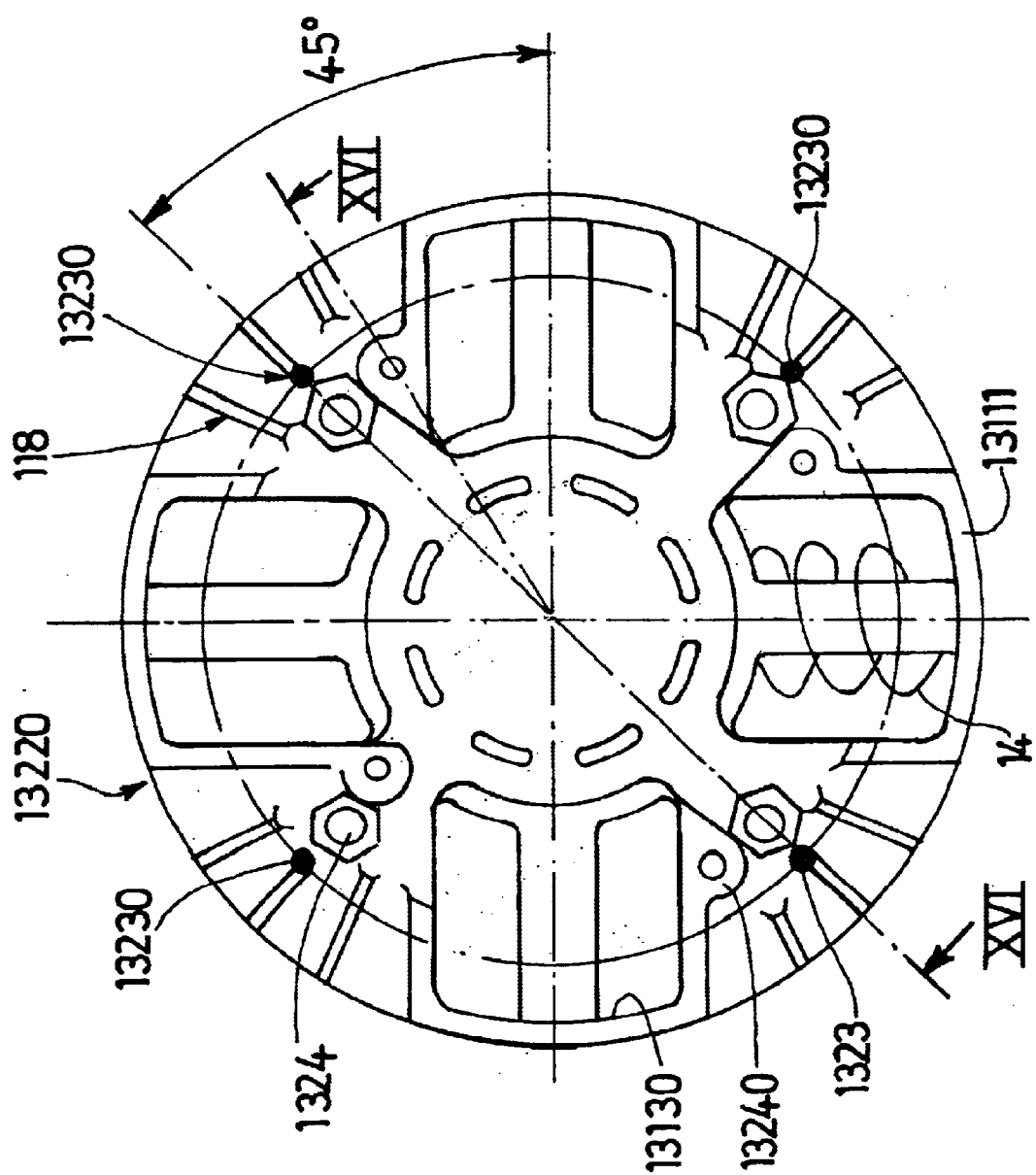
FIG. 15 is a view in elevation similar to FIG. 1 for another embodiment variant.

By reference first of all to FIG. 1, the rotor of a rotating machine, such as an alternator or an alternator/starter, has been represented overall by the reference 10. This machine is preferably intended to be employed in a motor vehicle.

As a reminder, it will be recalled that an alternator/starter is a rotating electric machine able to work in reversible fashion, on the one hand, as an electricity generator—alternator function and, on the other hand, as an electric motor especially for starting the internal-combustion engine of the motor vehicle. Such an alternator/starter is described, for example, in the document WO 01/69762, to which reference should be made for further details.

In the side view of FIG. 1, which reveals an axial extremity of the rotor, the cut-out contour of the rotor is seen clearly.

As is apparent in FIGS. 3 and 4, the structure of this rotor includes an assembly of magnetically conducting metal plates 11, all the plates 11 having the same contour. These plates 11 form a pack of cut-out plates and constitute the body of the rotor.

The plates, of generally circular shape, comprise a central aperture 110 so as to be mounted on the rotational shaft 12 of the machine.

On either side of the pack of plates thus constituted, two retaining pieces designated by the general reference 13 are also mounted on the shaft 12. The pieces 13 are axially thicker here than the plates 11.

The pieces 13 and the plates 11 here are linked in rotation to the shaft 12. More precisely, the shaft 12 is knurled for rotational fixing of the pieces 13 and of the plates 11 onto this shaft.

The fitting, the form and the function of these retaining pieces will be explained later on in this text. In the embodiment described, each of these retaining pieces 13 consists of two elements fitted onto the shaft 12 around the plates, that is to say from the centre towards the outside of the rotor:

a cap 131, which is in direct contact with the plates 11, and which is more particularly represented in FIG. 10. Each of the two caps is produced from ferromagnetic material (for example steel) in the particular embodiment described here, and a flange 132 which axially frames the plates 11 and the caps 131, and which is represented more particularly in FIG. 5. The two flanges 132 are produced from a non-magnetic material such as aluminum, and are axially thicker here then the caps 131.

The plates, the two caps and the two flanges are thus fitted onto the knurled shaft 12 in such a way as to be driven in rotation by it. Here, the caps 131 centrally feature a hub 1312 directed axially in the opposite direction to the plates 11 for fixing in rotation onto the knurling of the shaft 12. The hubs 1312 also serve for axial keying; a locking piece (not referenced) force-fitted onto the knurling of the shaft 12 serving for axial locking in one direction. This piece is configured to work in co-operation with the inner ring of a ball bearing (FIG. 14). In the other direction the locking is achieved by the use of a shoulder of the shaft 12.

By reference now to FIG. 10, a view has been represented in elevation along the axial direction of the rotor of a cap 131. This cap has the same contour as each of the plates 11 and is axially thicker than a plate 11.

This contour, of cut-out shape, is of generally circular shape and includes poles 1310 and 3011, distributed alternately along an orthoradial direction, and projecting from the centre of the cap towards its periphery. The same goes for the plates 11. The cap as a whole is produced in a single piece and forms a piece with central symmetry.

Each pole 1310 consists of an arm extending radially towards the outer periphery of the cap, a region in which the pole 1310 terminates in a projecting return 13100 situated at the extremity of the pole 1310, and which appears better on the sectional view of FIG. 11.

This return is oriented substantially at 90° with respect to the arm of the pole 1310, such that it will be located substantially parallel to the rotational shaft when the cap is mounted on this shaft. When the elements of the rotor are assembled, the returns 1310 extend axially in the opposite direction to the plates of the rotor.

It will be noted, however, that it is equally possible to design the return 13100 with an orientation no longer perpendicular to the arm of the pole 1310, but slightly re-entrant towards the rotational axis of the machine, forming an angle α which may be of the order of 9° with the direction of the axis of symmetry of the cap, as represented in FIG. 3.

This arrangement has the advantage of preserving the rotor from inadvertent contact with the stator in the event of a sudden jolt or shaking of the machine.

The function of this return 13100 is to retain an electrically conducting coil 14, in the radial direction, this coil being wound around each salient pole 1310 (FIGS. 1 to 3), counter to the centrifugal force to which the coil is subjected when the machine is rotating. The specific orientation given to the return 13100 in FIG. 3 makes it possible yet further to enhance the effectiveness of this retention.

Coming back to the figures more specifically showing the cap, FIG. 13 shows the end of a pole 1310 seen along the direction XIII parallel to the arm of the pole.

It will be noted here that the return 13100 has a pointed shape, in this instance trapezoidal, with a point 13101 situated at the extremity of the return, and a base 13102 integral with the arm of the pole. This makes it possible to reduce the mass of the return 13100 situated at the periphery of the rotor and to enhance the inertial performance of the machine.

The poles 1311 of the cap, for their part, consist of an arm extending radially over the same length as the arms of the poles 1310, but including a recess 13110 intended to accommodate at least one permanent magnet. To that end, the recess 13110 is of reduced width at its outer periphery so as to form shoulders for retaining the permanent magnet.

The recesses 13110 extend over substantially the entire length of the poles 1311; they are open onto the outer periphery of the poles 1311 and therefore of the cap 131, such that the flux from the magnet or magnets contained in each recess can circulate directly in the gap of the machine separating the rotor from the stator (not represented), which enhances the qualities of the machine.

At the other end, along the radial direction, the recesses 13110 are closed, at their inner periphery, by the hub 1312 of the cap, in such a way that they are blind and open only towards the outside.

These blind recesses are again found on the plates 11, which have the same contour as the caps 131.

In the embodiment described here, each recess 13110 forms a housing, which contains not a single magnet, but two permanent magnets, superimposed radially so as to generate an orthoradial magnetic flux as described in the document WO 00/57534 to which reference should be made for further details.

Thus there is located, in each recess 13110, as represented more particularly in FIG. 3, a permanent magnet 15 made of ferrite situated close to the central hub 1312 of the cap 131, topped off by a magnet made of rare earths 16 the surface of which is close to the gap of the machine.

The fact of thus having available a rare-earth magnet at the periphery of a recess open onto the outer banding of the rotor further enhances the quality of the magnetic fluxes and the operation of the machine.

By describing the periphery of the cap, four pairs of poles 1310 and 1311 are thus found, the poles 1310 and 1311 being circumferentially alternate, two consecutive poles being separated by recesses 1313. More precisely, a pole 1310 is arranged between two consecutive poles 1311; the recesses 1313 being arranged on either side of the pole 1310, each being delimited by the pole 1310 and the pole 1311 in question.

According to the invention, it is possible to arrange any number of salient pole pairs 1310 intended to accommodate an excitation coil 14, thanks to the recesses 1313, and of salient poles 1311 intended, thanks to the recesses 13110, to accommodate at least one permanent magnet.

As is revealed clearly from the description and from the drawings, each pole 1311 is in reality broken down into two poles thanks to the recess 13110; each permanent magnet being mounted between two poles, in such a way that the machine here includes 12 poles.

The cap 131 likewise, on either side of a recess 13110, includes two through orifices 1314 on each pole 1311, so as to allow screws 17 to be engaged, which pass through the metal plates and the two caps which surround them, as well as the two flanges 132 which likewise comprise corresponding orifices, the screws being tightened by nuts 171 so as to secure the plates, the caps and the flanges around the shaft 12.

The orifices 1314 can be arranged differently, so as to ensure correct fixing of the assembly; however, as will be seen in detail, their role is also to fix, onto the outside, flanges of the fan blades 18 which, driven by the rotation of the flange with the assembly, provide a circulation of air making it possible to prevent excessive heating of the coils 14, the end buns of which protrude axially beyond the caps.

It should be said that "outer", with no stipulation as to the direction, generally signifies turned away from the centre of the rotor along the axial direction (i.e. away from the pack of plates 11), "inner" signifying turned towards the centre along the axial direction (i.e. towards the pack of plates).

Hence, the orifices 1314 will preferably be placed close to the outer periphery of the cap and of the plates. Moreover, such a placing of the blades 18 likewise makes it possible, as can be seen in FIG. 14, optimally to cool any excitation coils which might be integrated into the stator of the machine, the shape and the arrangement of the blades possibly being adapted in order to generate a circulation of air comprising an axial component and a radial component.

In order to guarantee correct positioning of the blades 18 on the flange, and their immobilisation—in particular in rotation—the wings 1321 of the flanges 132 are fitted with projecting bosses 13210 on their outer face; these bosses make it possible to set the position of the blades in the embodiment described here, in which the blades are affixed onto the flanges by screws.

The blades can also be fixed onto the flanges by any other known mode (welding or otherwise) or made of the same material as the flange which carries them (FIG. 15).

The cap, in its central region, also comprises four other through orifices 1315 which do not contribute to a fixing function, but make it possible to optimise the closing of the field lines in the rotor, avoiding them being diffused into the central region of the rotor.

As has been said, the plates 11 have the same contour as the cap, such that not only salient poles are again found here, corresponding to the poles 1310 and 1311, but also orifices corresponding to the orifices 1314 and 1315.

Hence it will be understood that the cap plays the role of an axial end plate, which includes means for radial retention of the coils 14. The cap, however, is thicker than the plates 11.

And the cap remains recessed from the flange along the axial direction, towards the centre of the rotor, such that the coils 14 wound around the salient poles of the cap and of the plates do not protrude axially outwards past the surface of the flange, as represented in FIG. 3. The coils 14 are excitation coils linked in a known way to a voltage regulator. These coils 14, according to one characteristic of the invention, therefore feature heads, usually called buns, which are therefore accommodated in the recesses 1323 of the non-magnetic flanges 132. The returns 13100 therefore retain the buns of the coils 14.

The flange 132, for its part, as has been seen, carries the fan blades 18 and, according to one characteristic of the invention, constitutes the non-magnetic part of the retaining piece 13.

It therefore also makes it possible, in the recesses 13110, along the axial direction, to retain the magnets 15 and 16, which are engaged axially in the cavities formed by these recesses, and which, furthermore, are held in the radial direction by returns R of the ends of the poles 1310 and 1311, which are oriented in the circumferential direction of the rotor.

More precisely, the recesses 13110 can be topped off by aluminum strips L which assist in retaining the magnets counter to the centrifugal force.

As these flanges are produced from non-magnetic material, they do not allow the field lines to close at the axial ends of the rotor.

As represented in FIG. 5, the flange 132 thus includes four wings 1321 distributed regularly around a central hub 1322, that is to say a number equal to the number of cavities 13110 enclosing the magnets. The wings are separated by recesses 1323.

And fixing orifices 1324 are again found on these wings, which are intended to be located facing the orifices 1314, and to receive the screws 17, which also serve for fixing the blades 18 onto the wings of the flange.

In that way, the wings 1321 of the flange come to lock the magnets axially in their cavities 13110, the recesses 1323 between these wings leaving the salient poles 1310, and the buns of the coils 14 which they carry, axially clear, as represented in FIGS. 1 and 2.

And in that way a rotor is constituted, circumferentially and alternately including permanent magnets and excitation coils, which makes it possible to reduce the radial size of the machine.

Hence, these coils are fully exposed to the air current generated by the fan blades 18 and are correctly cooled.

Hence it is apparent that the flange 132 in reality fulfils three functions:

retaining the magnets 15 and 16 in the recesses 13110, carrying the fan blades 18, and axially protecting the buns of the coils 14, which do not protrude past the wings of the flange axially as a result of the offsets between the surfaces of the cap and of the flange along this direction.

The flange 132, being thicker here than the caps 131, also fulfils a supplementary function, namely dynamic balancing of the machine. Material is removed, for example by piercing, at the desired places.

In one embodiment variant, the cooling of the coils can be carried out not by ventilation, but by a circulation of water within the support of the stator which, in a known away, the rotating electric machine includes as described, for example, in the document DE 100 19 914. It is likewise possible to combine the two types of cooling by air and by water.

Furthermore, the coils 14 in reality form one coil, which can be obtained by placing the four coils 14 in series and/or in parallel depending on the applications. In FIGS. 1 and 2, the windings of the various salient poles 1310 are linked in series by the same electrically conducting wire 140.

And to get from one pole 1310 to the next one, the wire 140 has to make a detour around the outside of the wings of the flanges (the flanges, moreover, being pressed axially onto the cap by the nuts of the screws 17 for locking the magnets).

In order for the wire not to protrude axially out of the rotor as a result of this detour, and in order to restrain this wire counter to the centrifugal force when the rotor is turning, the wings 1321 of the flange 132 are equipped, on their outer face, with grooves 1325 allowing the wire 140 to pass through in the thickness of the flange. In a variant, the grooves are formed in the inner face of the flange 132.

In the figures, it is observed that these grooves have an oblique orientation so as to be aligned with the wire 140. Some wings of the flange could thus include a single oblique groove, whereas others, on their outer face, includes two intersecting oblique grooves.

The fact of providing intersecting oblique grooves makes it possible to use the same flange with different orientations of the wire 140, and avoids having to provide different flanges.

FIG. 14 represents a machine according to the invention, in radial section, in which a rotor 10 as described above is mounted on the shaft 12; the rotor being surrounded by a stator 2000 with a radial gap being present between the inner periphery of the stator and the outer periphery of the rotor.

In the embodiment described above, the flange and the cap constitute two separate pieces.

It is equally possible according to the invention to assemble them together into a single retaining piece 13, as described, for example, below in FIGS. 15 and 16. In a variant, the fixing of the plates 11 and of the pieces 13 is achieved by riveting.

In the case in which the flange and the cap thus form a single retaining piece 13, this piece should be produced from a non-magnetic material in order to avoid closing the magnetic-field lines at the axial ends of the rotor.

And in this case, the returns 13100 will be provided directly on the single retaining piece 13, which brings together the flange and the cap.

It is apparent that the machine according to the invention makes it possible to obtain great flexibility and efficiency, by virtue, in particular, of the uniform distribution of the field lines along the axial direction (rotor with stacked plates and not with claws, compound excitation at [sic] the rotor), and provides substantial and efficient cooling of the machine by virtue of the fan blades.

It is stipulated that these blades may be of different sizes and formats, and adapted to the machine and to the coils, and that their number per flange wing can vary.

It is equally possible to imagine other means of cooling the coils, such as two fans mounted on the shaft of the machine on either side of the rotor, and driven in rotation by the shaft (at a speed equal to the rotational speed of the rotor, or a different speed in order to augment the relative wind between the blades of the fan and the coils of the rotor).

In this case, a space will preferably be formed in the axial direction between each of the two fans and the rotor, so as not to damage the buns of the coils.

It is equally possible to make the blades integral with the poles of the cap, in the case in which the retaining pieces 13 include a cap and a flange, as in the description above.

The machine described may include a diode bridge or a transistor bridge or a combined bridge (diodes/transistors) integrated into the machine or separate from it.

Finally, the excitation coils can be produced with a wire 140 of round or even square cross-section.

And the stator of the machine may comprise excitation coils, for example two three-phase coils offset by 30° in order to reduce the voltage ripple and the magnetic noise.

This stator referenced as 2000 in FIG. 14 includes a body including a pack of plates featuring notches internally for mounting of the armature coils possibly including electrically conducting elements in the form of round wires or of pins. Such pins are described, for example, in the documents WO 92-106527 or PCT/FR 01/04147. The pins may, for example, have a U-shape overall, having a rectangular cross-section in one embodiment.

Each phase of the stator, in one embodiment, includes two windings offset in the above-mentioned way by 30° such that the number of notches of the stator is increased with respect to that of the document WO-92 106527. In a variant, the windings are mounted in parallel in such a way that the stator carries two series of three-phase coils offset by 30° electrically as mentioned in the above-mentioned document PCT/FR 01/04147. In a general way, the polyphase coils of the stator with pins may include one notch per pole and per phase or two notches per pole and per phase with a number of turns, for example from 1 to 16, depending on the applications. A low number of turns may make it necessary to have several pins in parallel.

The outputs of the phases are linked to a bridge of rectifier elements, for example with diodes (not referenced in FIG. 14) carried by a rear bearing 2001, the said rear bearing furthermore centrally carrying a ball bearing for supporting the rear end of the shaft 12, equipped with collector rings with which brushes interact, the brushes being integral with a brush holder partially visible in FIG. 14. The bridge is mounted in a known way between earth and an electrical power-supply line linked to the positive terminal of the battery and belonging to a device for supplying electricity to the on-board network of the motor vehicle. As is known, the phases of the stator belong to the armature of the alternator, in such a way that an alternating current is generated which it is necessary to rectify in order to recharge the battery of the vehicle and to supply power to the consumer units of the vehicle. In a variant, the rectifier elements include transistors, especially of the MOS type, when the rotating electric machine is an alternator/starter as described, for example, in the document FR A 2 745 445, the bridge then being a rectifier bridge and a control bridge. In a variant, as described in the document WO 01/76052, two power-supply sources are provided. Each source includes at least one armature coil carried by the stator, a bridge of rectifier elements and an auxiliary bridge of rectifier elements respectively of the positive and negative type. Means are provided for linking the two auxiliary bridges. These means are able to be controlled so as, in a first state, to link the two auxiliary bridges in series and, in a second state, to block the link between the two auxiliary bridges such that the two sources supply power in parallel to the electrical power-supply line of the on-board network of the motor vehicle.

The rear bearing 2001 is linked to a front bearing 2002, for example by tie rods which are not visible in the Figure, in order to form a fixed support for the stator 2000, knowing that the front bearing also centrally includes a ball bearing rotationally carrying the front end of the shaft 12 on which the drive pulley (not referenced) is carried, which is linked to the internal-combustion engine of the motor vehicle by a transmission including a belt.

The rotating machine according to the invention may therefore have the structure of a stator and of the bearings of a conventional alternator, like the one described in the document EP-05152592 to which reference should be made for further details; the bearings 2001, 2002 being pierced for circulation of the air within the machine.

The machine according to the invention is thus of small bulk and of high electrical power, while not being at all noisy.

This machine may rotate at high rotational speeds.

Needless to say, in a variant, the bearings 2001, 2002, that is to say the support of the stator, may include channels for circulation of a fluid for cooling the machine.

This machine is well adapted to operate at different voltages with an on-board network of 42 V, 150 V, 216 V for hybrid-type vehicle applications.

In a variant, the machine may work at a higher voltage and drive the motor vehicle as described in the document DE C 41 39 843 to which reference should be made for further details.

Needless to say the permanent magnets, in another hybrid-machine configuration, may be configured radially in order to generate a radial magnetic flux as described in the document U.S. Pat. No. 6,147,429 to which reference should be made for further details. In this case the housings, of circumferential orientation, of the permanent magnets are closed at the outer periphery of the rotor. The same is true in FIGS. 15 to 16, in which the permanent magnets 116 are buried in the housings 1160 formed in the plates 11.

Figure 16:
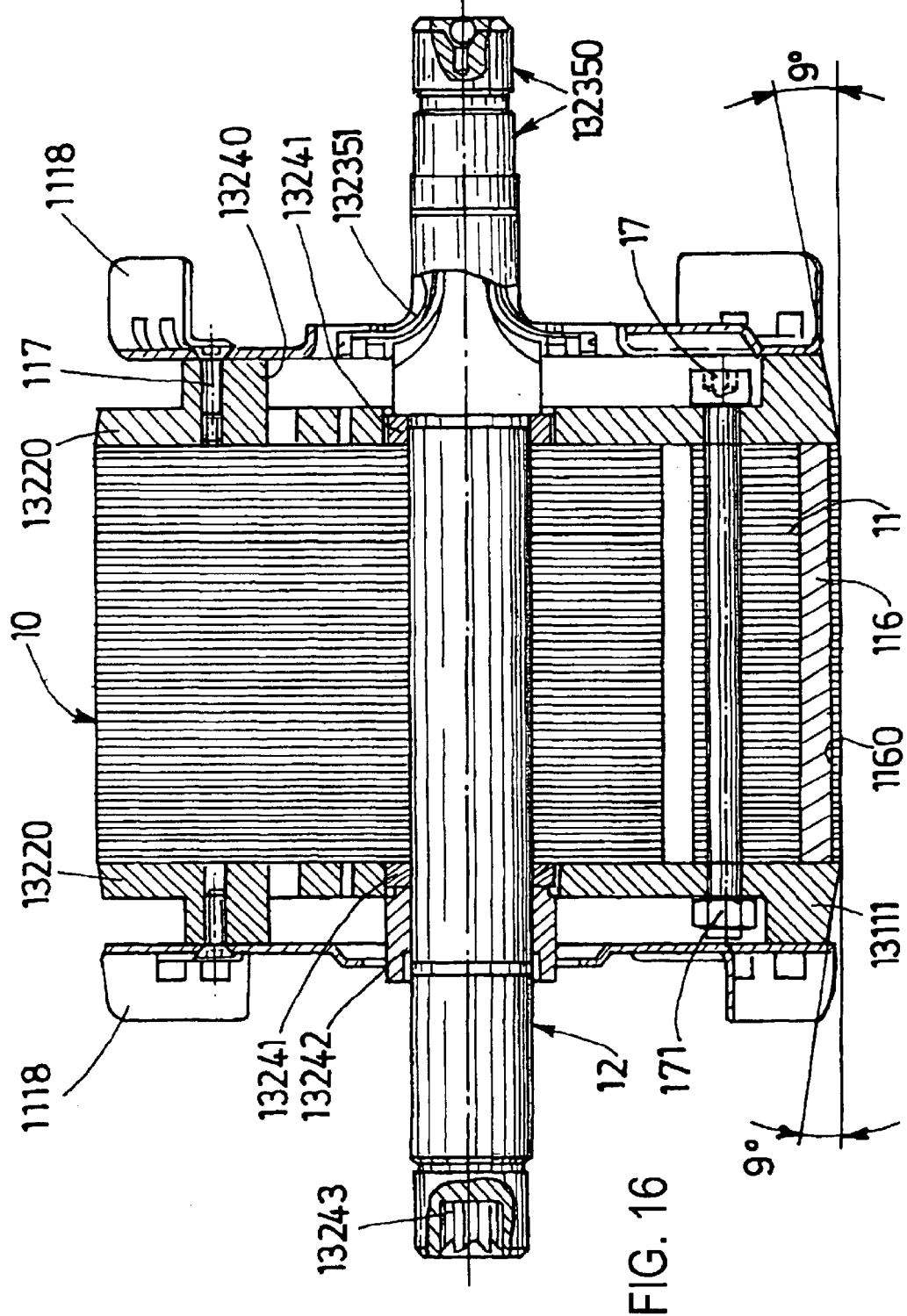
FIG. 16 is a sectional view along the line XVI—XVI of FIG. 15.

In these FIGS. 15 and 16, advantageously between two poles with consecutive permanent magnets, for example of the North type, the following arrangement is in place at the outer periphery of the rotor:

one pole with North permanent magnet, one pole without any, one wound pole like the pole 1311, one pole without any and one pole with North permanent magnet.

When the coil 14 is not excited, the magnetic flux generated by the magnets passes through the stator with notches such that the rotor, at its outer periphery, between two consecutive North poles, features three South poles. When the coil 14 is excited, the central South pole then becomes a North pole.

As described in the document U.S. Pat. No. 6,147,429, the pattern NSSS is encountered four times repetitively in FIGS. 15 and 16, which corresponds to 16 poles. In a variant, three coils 14 are provided and the machine includes 12 poles. All the configurations of the above-mentioned US document can be envisaged.

In FIGS. 15 and 16 the machine includes four coils 14 linked all in series, all in parallel or in series/parallel, depending on the application.

In these figures, the retaining piece features only one element, namely a multi-function non-magnetic flange 13220. This flange is aluminum-based and features, at its outer periphery, axial extensions 13111 directed in the reverse direction with respect to the pack of plates 11 of the rotor and shaped to retain the excitation coils counter to the action of the centrifugal force.

The end part of the said extensions is inclined towards the rotational axis of the machine, here at an angle of 9°.

The extensions 13111, of pointed shape, such as trapezoidal, constitute the upper edge of windows delimiting recesses 13130 for accommodating buns of the excitation coils 14.

These windows include bosses 13240 fitted with tapped holes (not referenced).

Four windows and four bosses 13240 are thus provided. These bosses serve for fixing fans 1118. These fans are of the conventional type and thus include a flange carrying axial-and/or radial-flow blades at its outer periphery.

The flanges are fixed onto the bosses 13240 by the use of screws 1117 screwed into the tapped holes of the bosses. In a variant, the fixing is achieved by riveting.

Pieces 13241 and 13242 are provided for axially immobilising the pack of plates 11 featuring, at their outer periphery, closed housings 1160 circumferentially for housing the permanent magnets 116. These pieces 13241 and 13242 are engaged onto the central knurling of the shaft 12 featuring, at one of its ends 13243, a blind cavity fitted with multiple internal toothing for fixing of the pulley which the alternator includes in a way which is known in itself.

Each flange 13220 likewise features regions 13230 for dynamic balancing of the machine.

Blades 118 are provided between two windows, made of a single piece by moulding with the flange.

Thus the machine includes two series of blades, namely the blades 118 and the blades arising from the fans 1118. These blades are mounted alternately circumferentially and are offset axially in such a way that the fans 118 do not interfere with the coils 14. The flange 13220 thus axially protects the coils 14, as in the preceding figures.

The flanges centrally feature apertures of oblong shape aligned with associated oblong apertures in the plates 11 so as to facilitate cooling.

The permanent magnets 116 are thus locked axially by the flanges 13220 featuring passages 1324, as do the plates, for the fixing screws 17, here in tie-rod form as in FIG. 4; the nuts 171 bearing against the flange 13220 in question.

In a variant, the pack of plate [sic] is fixed by buttoning and the fan 118/flange 13220 assembly is fixed by riveting onto the plates 11.

In a variant, the flange 13220 and the fan 118 are in a single piece obtained, for example, by moulding.

The permanent magnets 116 are retained axially by the flanges in the region of the areas featuring the blades 118.

In FIG. 16 two collector rings are seen, at 132350, on which brushes carried by a brush holder and linked to the voltage regulator which the machine includes are allowed to rub, in a way which is known in itself.

These rings are linked by wire links 132351 to the ends of the excitation coils 14 one of which is represented diagrammatically in FIG. 15; the grooves for the linking wires to pass between the coils 14 being formed on the inner face of the flanges, that is to say the face which is turned towards the pack of plates 11.

All the combinations are possible. Hence, in FIG. 16, the linking-wire passage grooves are formed in the outer face of the flange 13220.

The housings 1160 are of oblong shape or of rectangular shape, for example, for fitting more economical permanent magnets of rectangular shape. In a variant, the rectangular-shaped permanent magnets are mounted in housings of trapezoidal cross-section facilitating the fixing of the magnets by bonding by the use of an impregnation varnish placed between the two end triangles of the housings 1160 which are not occupied by the magnets. It is then necessary to provide holes for access to these triangles in the flanges 13220.

What is claimed is:

1. Rotating electric machine, especially an alternator or alternator/starter for motor vehicles, including a stator surrounding a rotor (10) equipped with a pack of metal plates (11), a gap between the stator and the rotor, permanent magnets (15, 16) integrated into the rotor and excitation coils (14) integrated into the rotor, in which the excitation coils are wound around salient poles (1310) cut out in the pack of metal plates of the rotor, and the permanent magnets are accommodated in housings (13110, 1160) formed in the pack of plates of the rotor, characterised in that the housings (13110) are closed axially at each of their ends by a retaining piece (13) equipped with a non-magnetic part (132, 13220) intended to come into abutment with the magnets, and in that the retaining piece features recesses (1323) for accommodating buns of the excitation coils.

2. Machine according to claims 1, characterised in that the retaining piece, at its outer periphery, features axial extensions (13100, 13111) directed in the reverse direction with respect to the pack of plates (11) of the rotor and shaped to retain the excitation coils (14) counter to the action of centrifugal force.

3. Machine according to claim 2, characterised in that the end part of the said extensions is inclined towards the rotational axis of the machine.

4. Machine according to claim 3, characterised in that the said extensions (13100, 13111) have a pointed shape, such as trapezoidal.

5. Machine according to claim 3, characterised in that the said extensions are carried by a ferromagnetic cap (131) which has the same shape as the plates, the said cap being interposed between the pack of plates and a non-magnetic flange (132), the cap and the flange constituting the retaining piece (13).

6. Machine according to claim 2, characterised in that the retaining piece (13) carries fan blades (18, 118, 1118), and in that the blades extend in projection from the retaining piece.

7. Machine according to claim 6, characterised in that the blades (118) are of a single piece with the retaining piece.

8. Machine according to claim 6, characterised in that the blades are attached to the retaining piece.

9. Machine according to claim 8, characterised in that the surface of the retaining piece features bosses for holding the blades.

10. Machine according to claim 1, characterised in that grooves (1325) are provided on the surface of the flange for accommodating a wire (140) of the excitation coils when the said wire passes from one coil, to the other.

* * * * *